H. G. RAFLOVICH.
ANTISKID TIRE.
APPLICATION FILED APR. 13, 1909.

965,331.

Patented July 26, 1910.

2 SHEETS—SHEET 2.

WITNESSES
Johna Bengtron
H. Whiting.

INVENTOR
Harry G. Raflovich
BY Munn & Co
ATTORNEYS

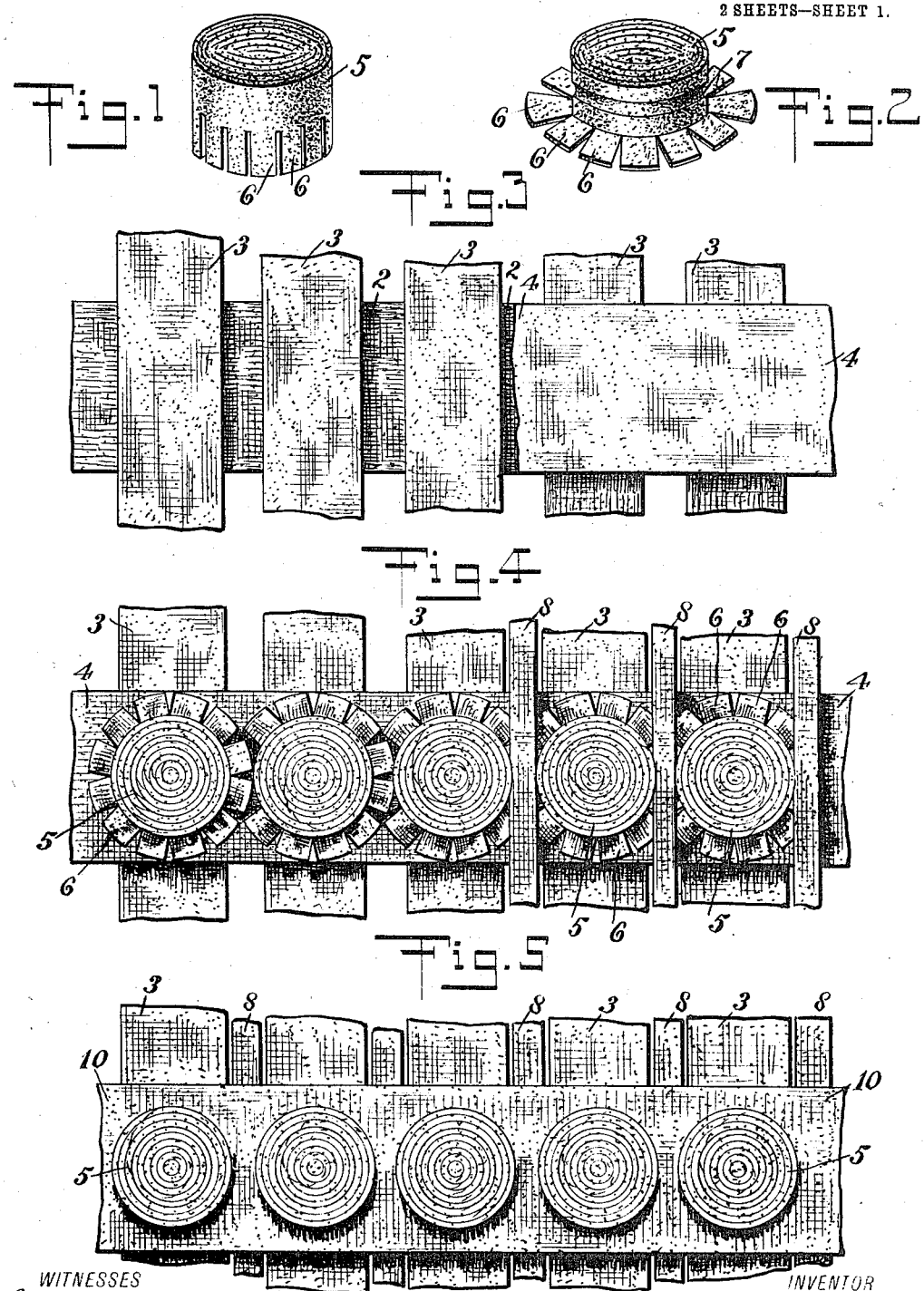

UNITED STATES PATENT OFFICE.

HARRY G. RAFLOVICH, OF JERSEY CITY, NEW JERSEY, ASSIGNOR TO RUBBER B. B. CO., OF BLOOMFIELD, NEW JERSEY, A CORPORATION OF NEW JERSEY.

ANTISKID-TIRE.

965,331.   Specification of Letters Patent.   Patented July 26, 1910.

Application filed April 13, 1909. Serial No. 489,640.

*To all whom it may concern:*

Be it known that I, HARRY G. RAFLOVICH, a citizen of the United States, and a resident of Jersey City, in the county of Hudson and State of New Jersey, have invented a new and Improved Antiskid-Tire, of which the following is a full, clear, and exact description.

This invention relates to a pneumatic tire, and particularly to that type known as antiskid tires.

The object of the invention is to provide a tire which will not skid or slide in starting, stopping, or going around curves, and which will wear well and at the same time be easily and cheaply constructed.

The invention consists, generally speaking, in a plurality of fabric studs which are secured to the body of the tire and impregnated with the rubber coating of the tire.

The invention further consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 6:
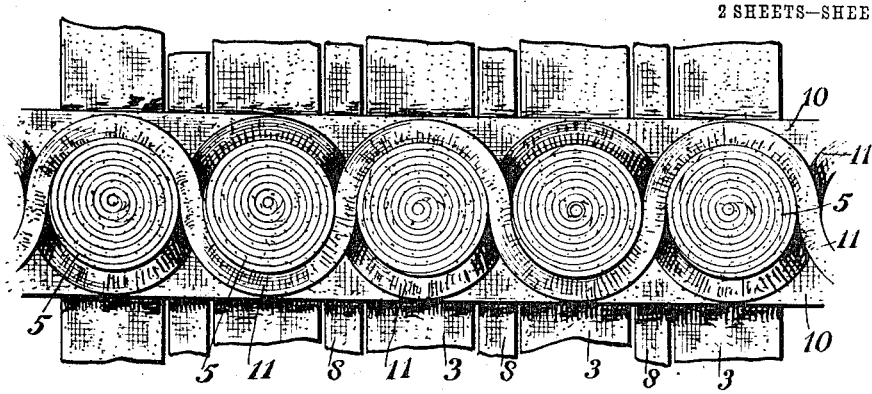
Figure 7:
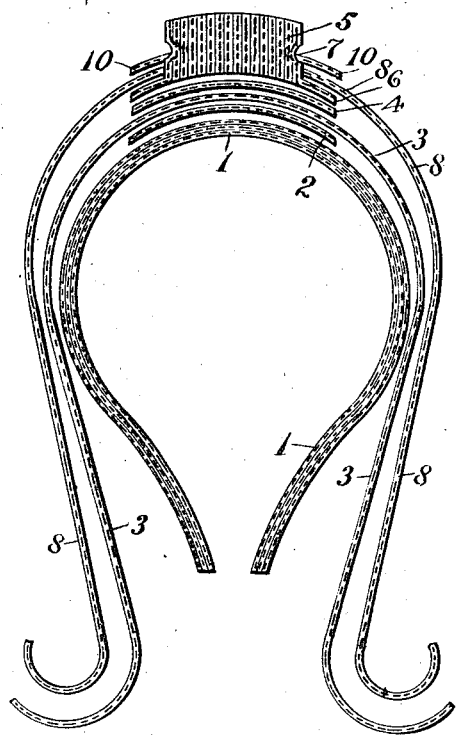
Figure 8:
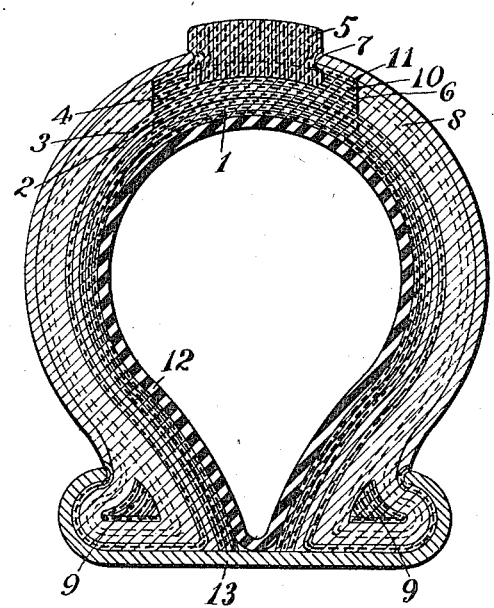
Figure 9:
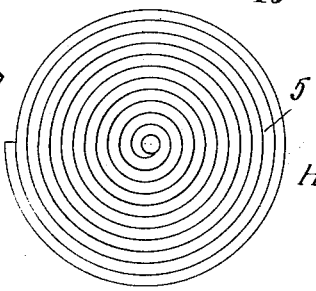

Figure 1 is a perspective view of one of the studs before being attached to the body portion of the tire; Fig. 2 is another perspective view of a stud, showing the flanges spread out ready to be attached to the tire, and illustrating the groove formed by the mold; Figs. 3, 4, 5 and 6 are plan views showing the steps in the process of making the tire; Fig. 7 is a cross section through the tire, showing the separate elements spaced apart; and Fig. 8 is a cross section through the completed tire. Fig. 9 is an enlarged plan view showing the spiral winding of one of the studs.

Referring more particularly to the separate parts of the device, there is provided, first, a plurality of fabric sheets 1, which may be of any suitable material, preferably canvas. These sheets are adapted to be secured together by any suitable material, such as cement or the like, and are adapted to have secured to their top surface, a longitudinal strip 2, to which are secured on its upper surface, transverse strips 3. The next layer above the transverse strips 3 consists of a longitudinal strip 4, to which are secured fabric studs 5, spaced at suitable intervals along the strip 4, which is made of any textile material.

The studs 5, as shown in Figs. 1 and 2, are preferably made of canvas, spirally wound so as to form a plug, the outer layer being wider than the inner layers, and being slit in any well-known manner, so that they may be bent back into the position shown in Fig. 2, so as to form flanges 6, which may be more readily attached to the strips or body portion of the tire. The studs 5 are preferably formed on a suitable mandrel, and then saturated with a suitable cement and placed in a mold, which forms a groove 7 thereon, the purpose of which will be described hereinafter.

In order to secure the studs firmly in position, there are provided additional transverse strips 8, which are placed between the studs 5, and overlie the flanges 6 thereon. These strips 8, together with the strips 3, pass down the sides of the tire and are wound around suitable beading strips 9, which are provided on each side thereof to furnish a suitable projection for the clencher rims to engage.

Overlying the transverse strips 8, and adapted to secure the studs firmly to the body portion of the tire, there is provided a longitudinal strip 10, which has perforations therein which are adapted to slip over the ends of the studs and thus form a means of tying the studs together.

In order to further strengthen the union of one stud with another, there are provided tie-strips 11, which wind in and out around the studs in snake-like fashion.

The various parts of the tire are made of suitable fabric, and are cemented together in any well-known manner. The whole is then covered with a coating or layer of rubber, which is vulcanized onto the body portion thereof, and comes to such a height on each stud that a portion of it will project beyond the surface of the tire proper, and ridges of rubber will form in the grooves of the studs, furnishing additional means for securing them to the body portion of the tire.

In Fig. 8, the tire is shown assembled with the inner tube 12 and a rim 13 of the wheel to which it is secured.

There is thus provided a composite tire formed of alternating strips of suitable fabric, such as canvas, to which is attached a series of fabric studs, and to which is added a suitable coating of rubber, which is vulcanized to the assembled parts in such a way that the studs form an anti-skid tread which projects slightly from the body portion of the tire.

Having thus described my invention, I claim as new and desire to secure by Letters Patent:—

1. In a tire, the combination with a body portion, of a plurality of fabric studs, and flexible flanges on said studs adapted to secure said studs to the body portion.

2. In a tire, the combination with a body portion, of a plurality of spirally-wound fabric studs, and flanges on said studs formed from one of the layers of said studs and adapted to secure said studs to the body portion.

3. In a tire, the combination with longitudinal strips, of transverse strips, fabric studs, and flexible flanges on said fabric studs adapted to secure said studs to said strips.

4. In a tire, the combination with sheets of fabric, of longitudinal strips for said sheets, transverse strips for said longitudinal strips, a plurality of anti-friction fabric studs, flanges on said studs adapted to secure said studs to said strips, a longitudinal perforated strip adapted to slip over said studs, and a rubber coating impregnating the several parts.

5. In a tire, the combination with a plurality of sheets, of a longitudinal strip adapted to be secured to said sheets, transverse strips adapted to overlie said longitudinal strip, a longitudinal strip adapted to overlie said transverse strips, a plurality of spirally-wound fabric studs having a groove in their outer surface, adapted to overlie said last-mentioned longitudinal strip, flanges on said studs adapted to secure said studs to said strips, transverse strips adapted to overlie said flanges to furnish an additional securing means, annular beading strips adapted to form a nucleus for said transverse strips to be wound on, a perforated longitudinal strip adapted to be slipped over said studs, tying strips woven in and out among said studs, and a rubber coating for the whole adapted to cover said strips and impregnating said strips and studs.

In testimony whereof I have signed my name to this specification in the presence of two subscribing witnesses.

HARRY G. RAFLOVICH.

Witnesses:
HORATIO WHITING,
PHILIP D. ROLLHAUS.